(12) United States Patent
Watts

(10) Patent No.: US 11,009,779 B1
(45) Date of Patent: May 18, 2021

(54) CAMERA TO CAPTURE SLOW TO HIGH SPEED FOOTAGE

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 0 days.

(21) Appl. No.: 16/877,183

(22) Filed: May 18, 2020

(51) Int. Cl.
*G03B 17/12* (2021.01)
*G03B 17/56* (2021.01)
*G03B 13/02* (2021.01)
*G03B 19/18* (2021.01)

(52) U.S. Cl.
CPC .............. *G03B 17/12* (2013.01); *G03B 13/02* (2013.01); *G03B 17/561* (2013.01); *G03B 19/18* (2013.01)

(58) Field of Classification Search
None
See application file for complete search history.

(56) References Cited

U.S. PATENT DOCUMENTS

| 3,767,295 | A | * | 10/1973 | Gerber | G03B 19/18 352/79 |
|---|---|---|---|---|---|
| 4,131,343 | A | | 12/1978 | Shoberg | |
| 4,322,140 | A | | 3/1982 | Takimoto | |
| 6,523,956 | B2 | | 2/2003 | Oshima | |
| 2005/0213964 | A1 | * | 9/2005 | Kreger | G03B 17/565 396/544 |
| 2006/0072020 | A1 | * | 4/2006 | McCutchen | H04N 5/772 348/218.1 |

* cited by examiner

*Primary Examiner* — William B Perkey
(74) *Attorney, Agent, or Firm* — Plager Schack LLP; Mark H. Plager; Eric Liou

(57) ABSTRACT

A camera with a rotating optical lens assembly is provided. The camera includes a housing, a main lens coupled to the housing, a ground glass coupled to the housing in the internal cavity and designed to capture an image of the subject from the main lens, a pair of optical assemblies rotatably mounted to the housing and each having a plurality of telescoping tubular lens assemblies, a magazine coupled to the housing and storing a film, and a motor coupled to the housing and operably connected to the pair of optical assemblies by a plurality of linkage members. The motor is designed to simultaneously rotate the optical assemblies in opposite directions to permit each telescoping tubular lens assembly that moves in temporary alignment with the ground glass to transfer the captured image of the subject to an exposed portion of the film.

10 Claims, 6 Drawing Sheets

CAMERA TO CAPTURE SLOW TO HIGH SPEED FOOTAGE

RELATED APPLICATION

The application claims priority to provisional patent application U.S. Ser. No. 62/820,331 filed on Mar. 19, 2019, the entire contents of which is herein incorporated by reference.

BACKGROUND

The embodiments herein relate generally to cameras for capturing motion picture. More specifically, embodiments of the invention are directed to a camera assembly to capture slow to high speed images.

Cinematographers and other professionals use cameras to produce film or television works. In many instances, these cameras are mounted to vehicles or cranes to capture images of the subject. There exist a variety of camera devices as disclosed in U.S. Pat. Nos. 6,523,956, 4,322,140 and 4,131,343. However, these camera devices are limited in their ability to produce high quality and reliable footage, especially when the film is traveling at a high-rate of speed.

As such, there is a need in the industry for a camera that addresses the limitations of the prior art, which comprises oppositely rotating optical lens assemblies that enhance the quality of low to high speed footage captured.

SUMMARY

In certain embodiments of the invention, a camera with a rotating optical lens assembly to capture enhanced quality footage of a subject at low to high speeds is provided. The camera comprises a housing comprising an internal cavity formed by a front face, a rear face, a top face connecting the front and rear faces together, a bottom face connecting the front and rear faces together, and a pair of side faces connecting the front, rear, top and bottom faces together, a main lens coupled to the front face of the housing, a ground glass coupled to the housing in the internal cavity and aligned with the main lens, the ground glass configured to capture an image of the subject from the main lens, a pair of optical assemblies rotatably mounted to the housing, each optical assembly in the pair of optical assemblies comprising a plurality of telescoping tubular lens assemblies, a magazine coupled to the housing and storing a film, and a motor coupled to the housing and operably connected to the pair of optical assemblies by a plurality of linkage members, wherein the motor is configured to simultaneously rotate the pair of optical assemblies in opposite directions to permit each telescoping tubular lens assembly in the pair of optical assemblies that moves in temporary alignment with the ground glass to transfer the captured image of the subject to an exposed portion of the film.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
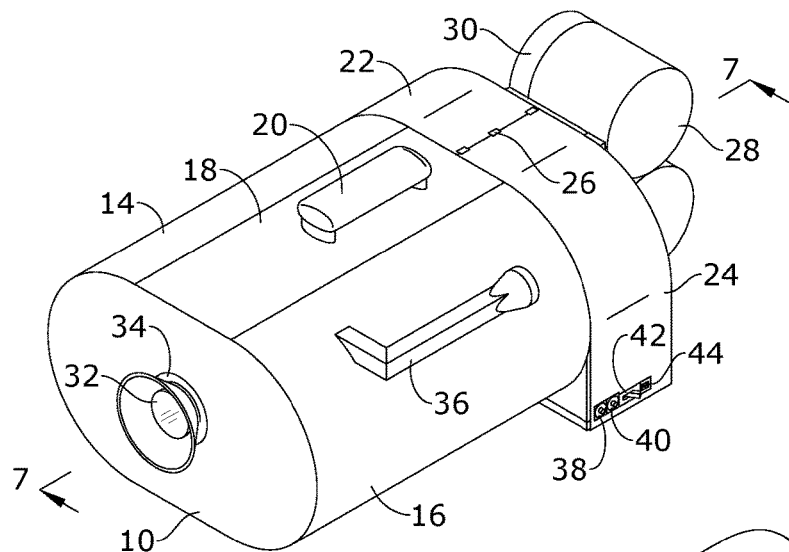
FIG. 1 depicts a top perspective view of certain embodiments of the camera.

In certain embodiments as depicted in FIGS. 1-4, the camera is configured to capture low to high speed footage of a subject with enhanced image quality. In one embodiment, the camera generally comprises a housing, main lens 32, a pair of optical assemblies 50, shutter base 80, front slide plate 84 and film magazine 28.

In one embodiment, the housing is made from aluminum or other material, and comprises front and bottom faces 10, first side face 14, second side face 16 and top face 18 connected together. Handle 20 is coupled to top face 18 to help a user to carry the camera as needed. In one embodiment as depicted in FIG. 3, first wing door 22 and second wing door 24 are pivotably mounted to the housing by hinge 26 to permit easy access to the internal components of the camera. In one embodiment as depicted in FIG. 2, bottom face 10 of the housing comprises mounting holes 12 to receive any number of fasteners to secure the camera to an object such as a vehicle, crane, tripod, other equipment or objects.

Figure 2:
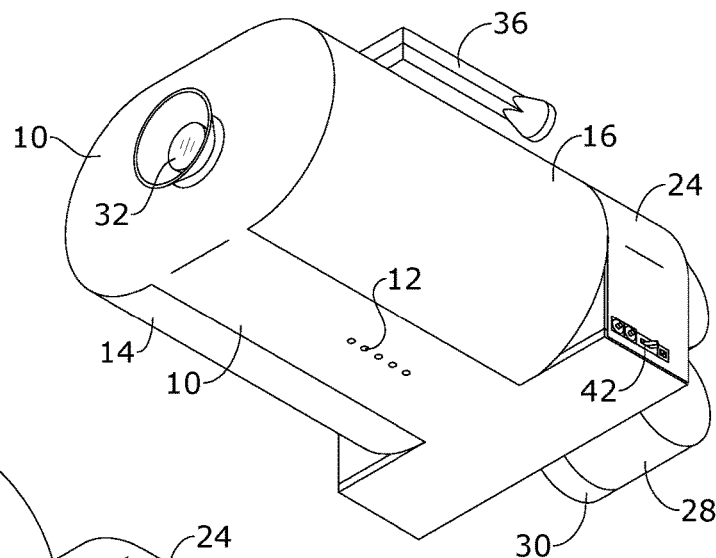
FIG. 2 depicts a bottom perspective view of certain embodiments of the camera.
Figure 3:
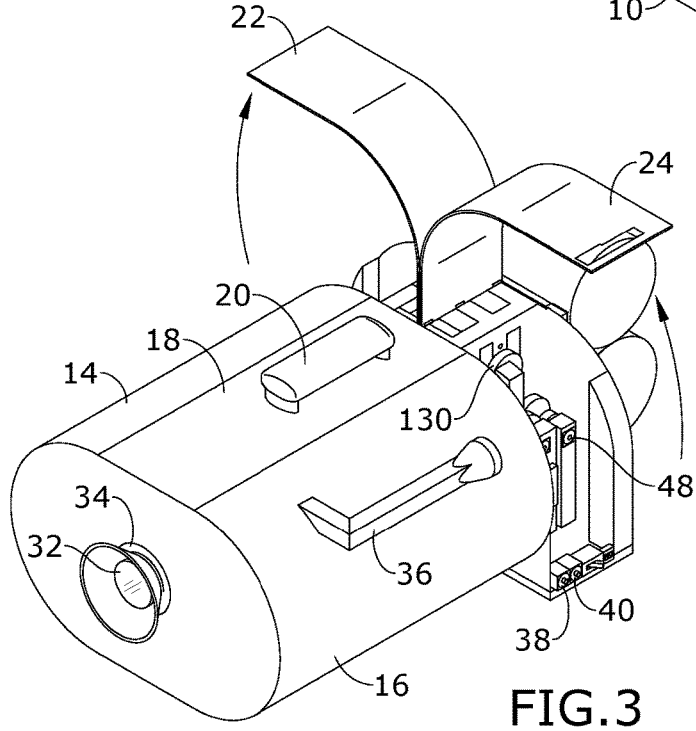
FIG. 3 depicts a top perspective view of certain embodiments of the camera.

In one embodiment as depicted in FIGS. 1-3, speed control 38, remote receiver 40, power switch 42 and power port 44 are accessible on the side of the housing to permit a user to easily control the operation of the camera. Other buttons, switches, dials, ports and the like can be located on the housing of the camera in alternative embodiments.

In one embodiment as depicted in FIGS. 1-3, main lens 32 is mounted to front face 10 of the camera by lens holder 34. Viewfinder 36 is coupled to second side face 16 of the housing to allow a user to view an image of the subject being captured by main lens 32. Film magazine 28 is coupled to the rear face of the housing and is configured to store film that will be exposed to capture the image of the subject through main lens 32 of the camera. It shall be appreciated that viewfinder 36 and film magazine 28 can be attached to different locations on the camera as desired in alternative embodiments.

In one embodiment as depicted in FIGS. 1, 4-5 and 7, ground glass 78 is coupled to internal cavity 11 of the housing by ground glass frame 76. In this embodiment, ground glass 78 is aligned with main lens 34. This allows ground glass 78 to capture a still image of the subject on the glass from main lens 34. Ground glass 78 can be any type known in the field and have variable specifications.

Figure 4:
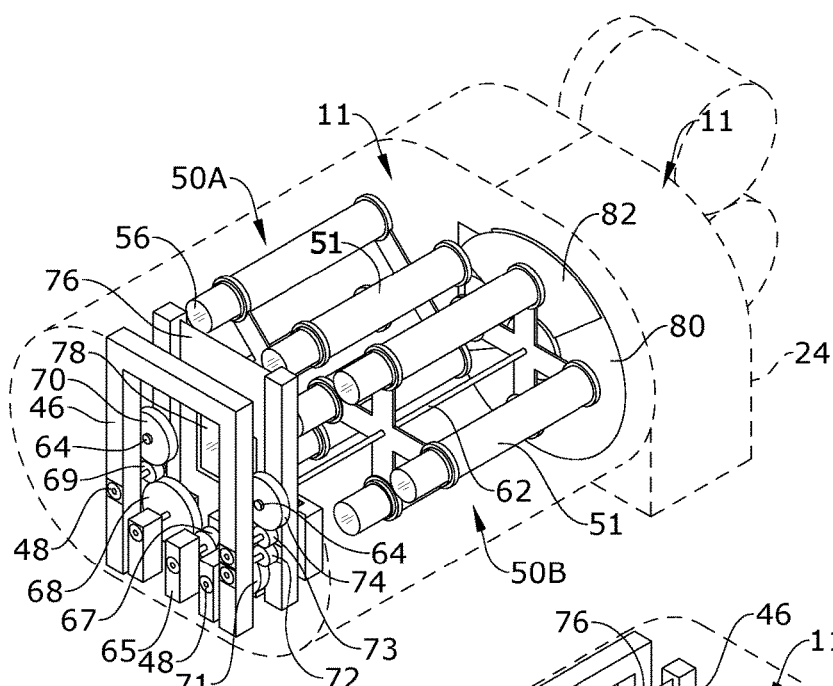
FIG. 4 depicts a front perspective view of certain embodiments of the camera illustrating certain internal components.
Figure 5:
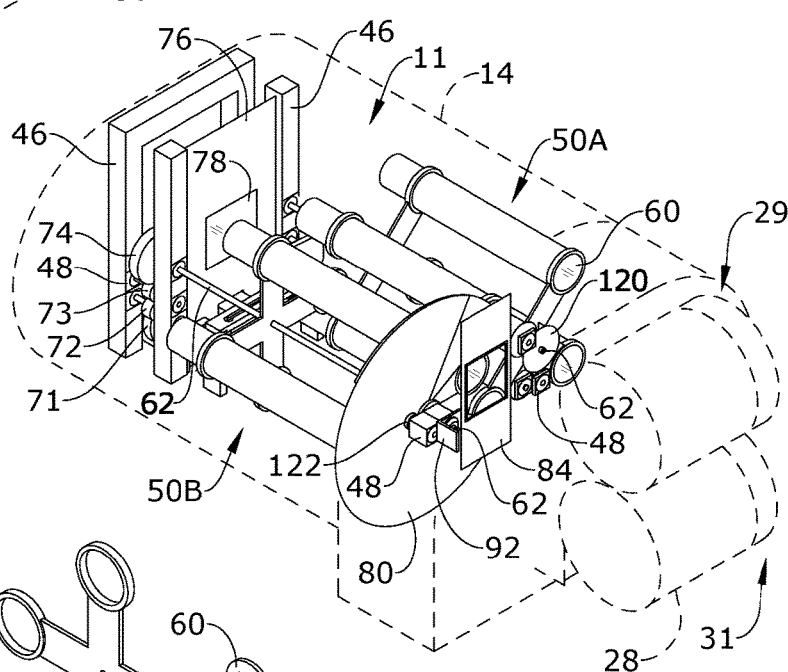
FIG. 5 depicts a rear perspective view of certain embodiments of the camera illustrating certain internal components.
Figure 6:
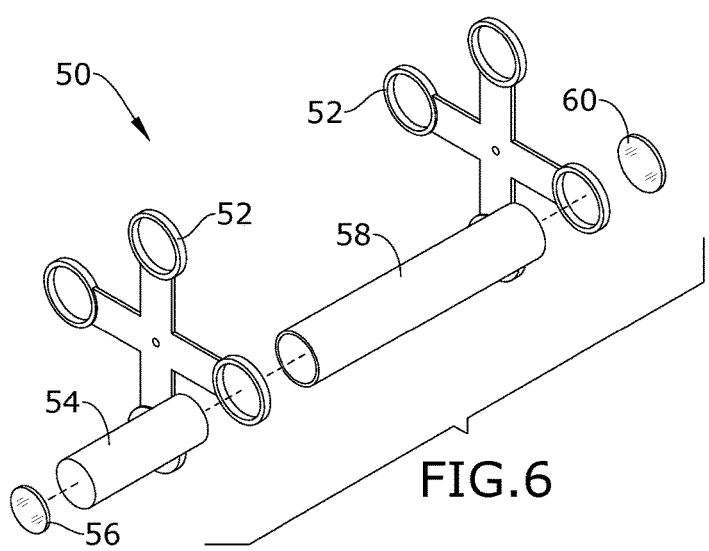
FIG. 6 depicts an exploded view of certain embodiments of the camera illustrating optical assembly 50.

In one embodiment as depicted in FIGS. 4-8 and 11, a pair of optical assemblies 50 is rotatably mounted to internal cavity 11 of the camera behind ground glass 78. In one embodiment, each optical assembly 50 comprises a pair of frames 52, rotatable shaft 62 and a plurality of telescoping tubular lens assemblies 51. In one embodiment as depicted in FIG. 6, the pair of frames 52 in each optical assembly 50 comprises four aligned pairs of openings configured to receive four telescoping tubular lens assemblies 51. However, it shall be appreciated that optical assembly 50 can be redesigned so that frames 52 accommodate two, three or any alternative number of telescoping tubular lens assemblies 51.

In one embodiment as depicted in FIGS. 4-6, each telescoping tubular lens assembly 51 comprises inner tube 54, front optical lens 56, outer tube 58 and rear optical lens 60. Inner tube 54 is slidably mounted to outer tube 58 with sliding adjustments controlled manually or via an actuator. In one embodiment, front optical lens 56 is coupled to the front end of inner tube 54. Similarly, rear optical lens 60 is coupled to the rear end of outer tube 58. Actuation of inner tube 54 relative to outer tube 58 allows telescoping tubular lens assembly 51 to focus on the image of the subject on ground glass 78 as will be described in more detail in the embodiments that follow.

In an alternative embodiment, each telescoping tubular lens assembly 51 can have any alternative number of lenses stacked together or secured at different locations on inner tube 54 and/or outer tube 58. This is also beneficial for use if the camera is used as a projector.

Figure 7:
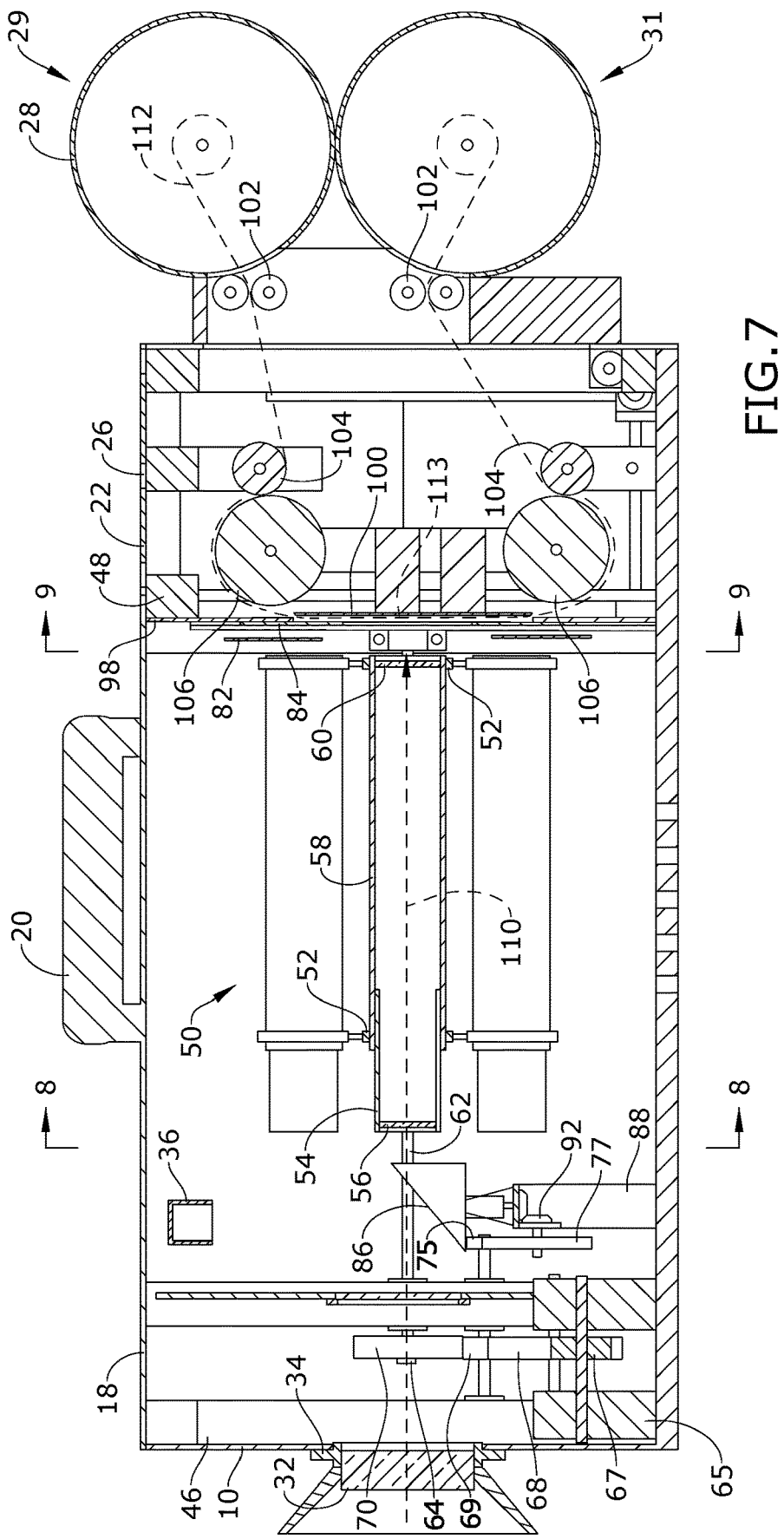
FIG. 7 depicts a section view of certain embodiments of the camera, taken along line 7-7 in FIG. 1.
Figure 8:
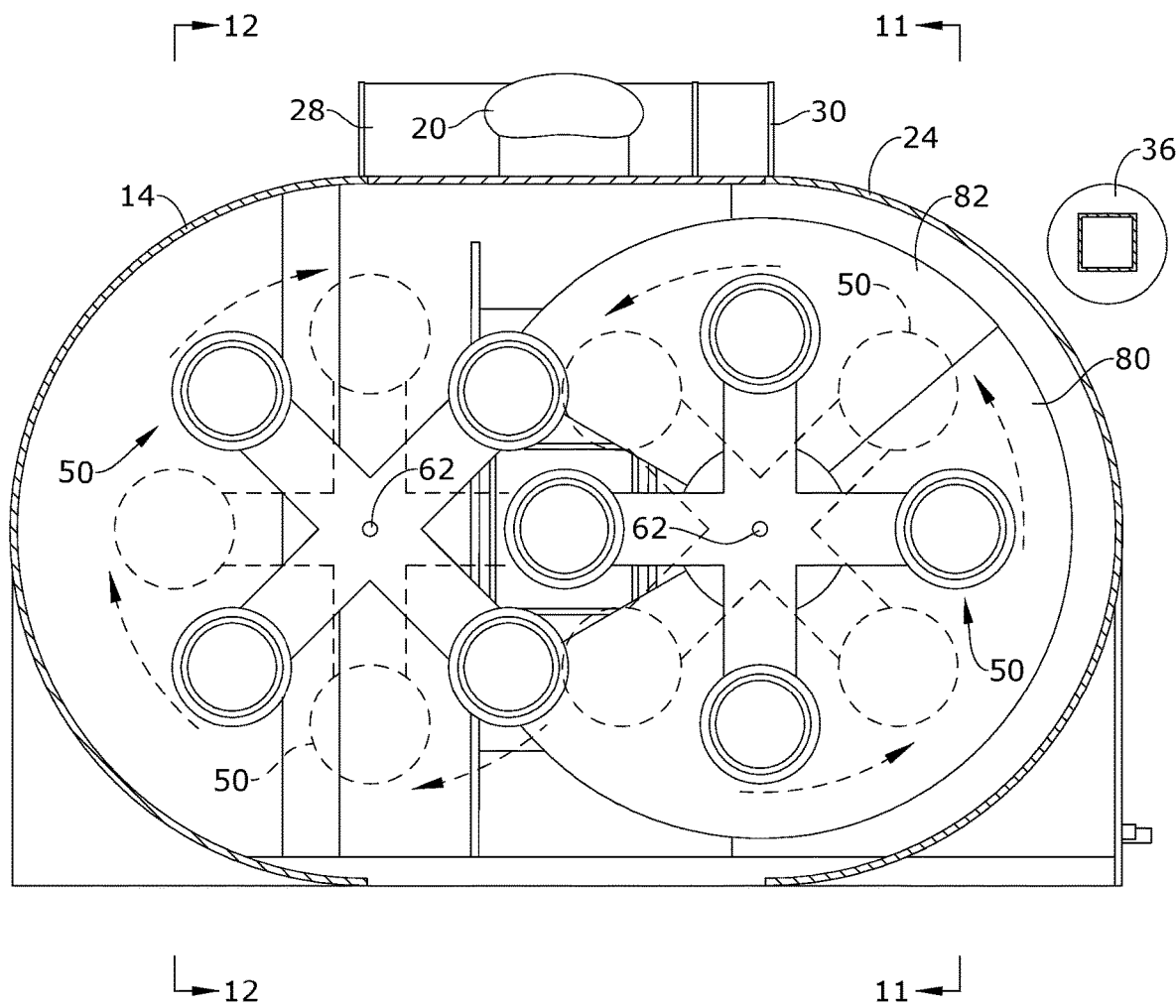
FIG. 8 depicts a section view of certain embodiments of the camera, taken along line 8-8 in FIG. 7 and illustrating the rotation of optical assemblies 50.

In certain embodiments as depicted in FIGS. 4-5 and 8, left optical assembly 50a and right optical assembly 50b rotate in opposite directions. This rotational movement of optical assemblies 50 is controlled through a series of linkage members that operably connect to a motor. In one embodiment as depicted in FIGS. 4-5, 7 and 11, the pair of optical assemblies 50 is operably connected to motor 66 and linkage members including motor gear 136, gear box gear 128, gear box 92, rotatable shafts 62 of optical assemblies 50, center gear 67, first front gear 68, second front gear 69, third front gear 70, fourth front gear 71, fifth front gear 72, sixth front gear 73, and seventh front gear 74. In an alternative embodiment, it shall be appreciated that any alternative number of linkage members such as gears, gear boxes, belts, sprockets or components can be used instead.

In one embodiment as depicted in FIGS. 5, 7-8 and 11, motor 66, motor gear 136, gear box gear 128 and gear box 92 are secured in the rear of the housing. Motor 66 can be of any type and have variable specifications. Motor 66 is operably connected to motor gear 136 and gear box gear 128, which is connected to gear box 92. These components are operably connected to rotatable shaft 62 extending through frames 52 of right optical assembly 50b. In one embodiment as depicted in FIGS. 4-5, rotatable shaft 62 of right optical assembly 50b is connected to seventh front gear 74, which is connected in series to sixth front gear 73, fifth front gear 72, fourth front gear 71, center gear 67, first front gear 68, second front gear 69 and third front gear 70. Third front gear 70 is connected to rotatable shaft 62, which is coupled to frames 52 of left optical assembly 50a.

In one embodiment as depicted in FIGS. 4-5, center gear 67, and first, second, third, fourth, fifth, sixth and seventh front gears 68, 69, 70, 71, 72, 73, 74 are secured to structural supports such as front tower 65 and support tower 46 inside internal cavity 11 of the housing. The movement of these gears together is facilitated by the use of bearings 48, rods and/or other components.

In this configuration, motor 66 drives motor gear 136, gear box gear 128, gear box 92, rotatable shafts 62 of optical assemblies 50, center gear 67, and first, second, third, fourth, fifth, sixth and seventh front gears 68, 69, 70, 71, 72, 73, 74. This allows motor 66 to simultaneously rotate left and right optical assemblies 50a, 50b in opposite directions as depicted in FIG. 8.

In one embodiment as depicted in FIG. 4, slip rings 64 are coupled to third front gear 70 and seventh front gear 74. Each slip ring 64 allows one or more electrical wires to pass through and extend through rotatable shaft 62. In this embodiment, the one or more electrical wires extend within rotatable shaft 62 and extend out through an opening in the shaft to electrically couple to any actuators connected to telescoping tubular lens assemblies 51 of optical assembly 50. As such, slip rings 64 provide a pathway for electrical wires that supply power to any actuators connected to optical assemblies 50. In an alternative embodiment, slip rings 64 can be mounted to the front and rear of rotatable shafts 62.

Figure 9:
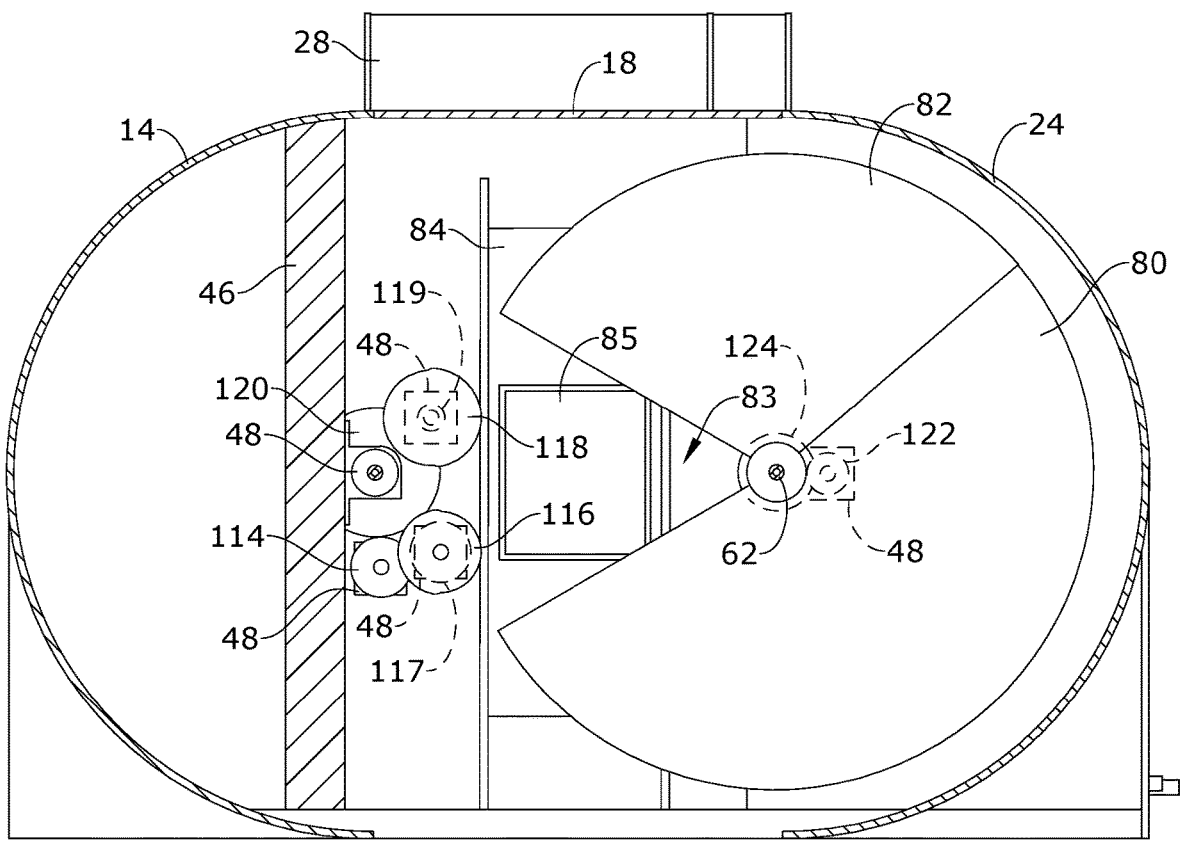
FIG. 9 depicts a section view of certain embodiments of the camera, taken along line 9-9 in FIG. 7.

In one embodiment as depicted in FIGS. 5, 7 and 9, front slide plate 84 is slidably mounted to internal cavity 11 of the housing. Front slide plate 84 comprises window 85 and is operably connected to a plurality of linkage members such as main shaft gear 120, first shaft gear 114, second shaft gear 117, third shaft gear 119, first slide plate gear 116 and second slide plate gear 118. In one embodiment as depicted in FIGS. 5 and 9, main shaft gear 120 is coupled to rotatable shaft 62 of left optical assembly 50a.

The rotation of rotatable shaft 62 of left optical assembly 50a drives main shaft gear 120, first shaft gear 114, second shaft gear 117 and third shaft gear 119. This movement drives first slide plate gear 116 and second slide plate gear 118, which directly connect to front slide plate 84. In this connection, first shaft gear 114 allows first and second slide plate gears 116, 118 to rotate in opposite directions.

In one embodiment, each gear in first and second slide plate gears 116, 118 comprises several missing teeth. The missing teeth in each gear allow each gear in first and second slide plate gears 116, 118 to engage front slide plate 84 in an alternating sequence. During this time, the engagement of first slide plate gear 116 with front slide plate 84 slidably adjusts front slide plate 84 down. The engagement of second slide plate gear 118 with front slide plate 84 slidably adjusts front slide plate 84 up.

As a result, operation of motor 66 through the described linkage members adjusts front slide plate 84 up in alignment with ground glass 78 as depicted in FIG. 7 and down out of alignment with ground glass 78 repeatedly while optical assemblies 50 rotate in opposite directions.

In one embodiment, first slide plate gear 116 moves front slide plate 84 down during engagement at the same speed that film travels from film magazine 28 as will be described later. Second slide plate gear 118 moves front slide plate 84 up during engagement at a quicker speed than when front slide plate 84 travels down. It shall be appreciated that any alternative number and combination of linkage members can be used to connect front slide plate 84 to motor 66 in other embodiments.

In one embodiment as depicted in FIGS. 4-5 and 7-9, shutter base 80 is rotatably mounted to internal cavity 11 of the housing and placed between optical assemblies 50 and front slide plate 84. In one embodiment, shutter plate gear 124 is directly connected to rotatable shaft 62 of right optical assembly 50b. Gear assembly 122 is operably connected to shutter plate gear 124 and comprises a pair of gears operably connected to shutter base 80. Gear assembly 122 rotates shutter base 80 at a faster rate than the rotation of rotatable shafts 62 of optical assemblies 50.

In one embodiment as depicted in FIG. 9, shutter 82 is rotatably mounted to shutter base 80. Shutter 82 is configured to rotate relative to shutter base 80 to adjust the size of cutout 83. Shutter 82 can be rotated manually, mechanically or electronically in different embodiments to create the proper sized cutout 83 to facilitate the required exposure time of the film to capture the image of the subject on ground glass 78.

As a result, operation of motor 66 through the described linkage members rotatably adjusts shutter base 80 at a high rate of speed to allow cutout 83 to provide a temporary unobstructed pathway to window 85 of slide plate 84. This is important to allow the film to capture the image of the subject from ground glass 78 as will be described in the following embodiments.

In one embodiment as depicted in FIGS. 1-2, 5 and 7, film 112 is loaded in film magazine 28 to capture the image of the subject. Film magazine 28 comprises top portion 29 configured to store the new portion of film 112 and bottom portion 31 configured to store the exposed portion of film 112. Upper and lower portions of film magazine 28 comprise doors 30 that can be removed to easily load and unload film 112 as needed.

Figure 11:
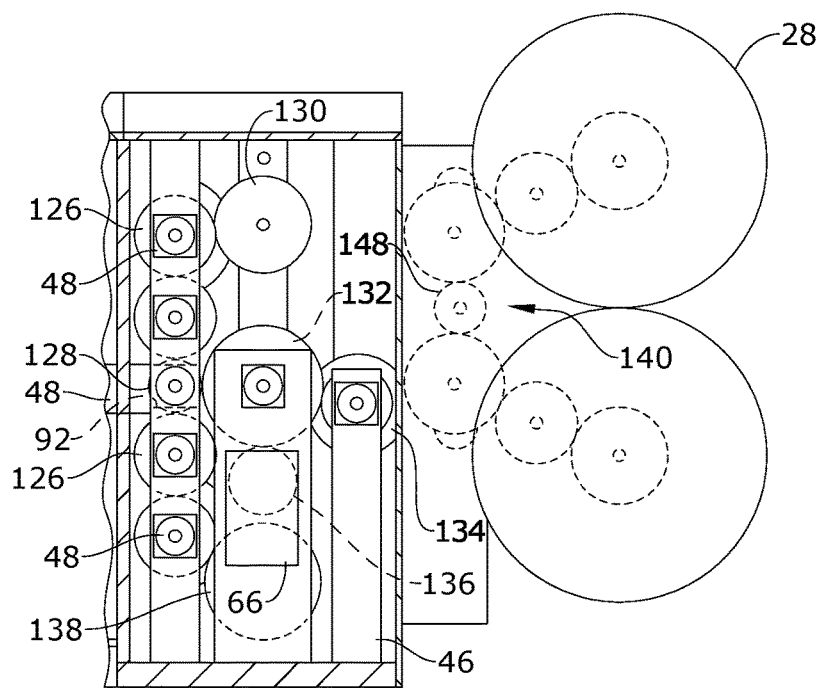
FIG. 11 depicts a section view of certain embodiments of the camera, taken along line 11-11 in FIG. 8.
Figure 12:
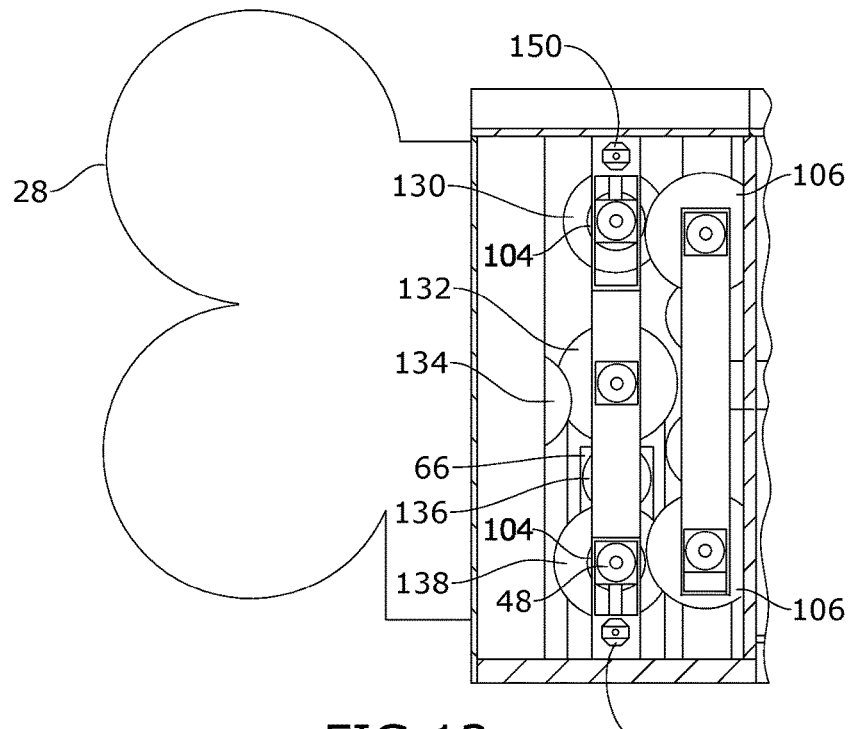
FIG. 12 depicts a section view of certain embodiments of the camera, taken along line 12-12 in FIG. 8.

In one embodiment as depicted in FIGS. 7 and 11-12, the movement of film 112 throughout the camera to capture images of the subject is facilitated by the use of a plurality of linkage members connected to motor 66. In one embodiment, the plurality of linkage members comprises motor gear 136, main connecting gear 132, magazine connecting gear 134, magazine gear assembly 140, large roller gear 126, first medium roller gear 130 and second medium roller gear 138.

In one embodiment, motor 66 drives motor gear 136. Rotational movement of motor gear 136 transfers through main connecting gear 132 and magazine connecting gear 134, which drives a plurality of gears in magazine gear assembly 140. This facilitates the movement of film 112 from top portion 29 of film magazine 28 to bottom portion 31 of film magazine 28.

In one embodiment as depicted in FIG. 7, small rollers 102, medium rollers 104 and large rollers 106 are in contact with film 112 and operably connected to the plurality of linkage members. As depicted in FIGS. 11-12, large roller gears 126 are configured to drive large rollers 106 and are operably connected to motor gear 136 by one or more gears. First and second medium roller gears 130, 138 are configured to drive medium rollers 104 and are operably connected to motor gear 136 by a plurality of gears. Similarly, any number of gears are operably connected to motor gear 136 and configured to drive small rollers 102.

The rotation of small, medium and large rollers 102, 104, 106 facilitates the movement of film 112 throughout the camera. In one embodiment as depicted in FIG. 12, first tension adjuster 150 and second tension adjuster 152 are configured to adjust the tension of film 112 throughout the camera.

In one embodiment as depicted in FIG. 7, film back plate 100 is secured to internal cavity 11 of the housing behind housing divider 98. Film back plate 100 provides a surface to support film 112 as it travels behind front slide plate 84.

In operation, the camera is maneuvered so that main lens 32 is directed toward a subject of interest. Motor 66 is enabled. The operation of motor 66 drives the plurality of linkage members described to enable optical assemblies 50 to rotate in opposite directions, shutter base 80 to rotate, front slide plate 84 to slide up and down, and film 112 to travel throughout the camera. All of these events occur simultaneously at a high-rate of speed as film 112 captures the image of the subject through main lens 32.

More specifically, the captured image of the subject follows path 110 as depicted in FIG. 7. In one embodiment, the captured image travels through main lens 32 to ground glass 78. As depicted in FIG. 8, an alternating sequence of telescoping tubular lens assembly 51 from left optical assembly 50a, telescoping tubular lens assembly 51 from right optical assembly 50b, another telescoping tubular lens assembly 51 from left optical assembly 50a and so forth approaches an alignment with ground glass 78 in a continuous and repeated sequence, due to the simultaneous opposite rotations of optical assemblies 50.

Each telescoping tubular lens assembly 51 slidably adjusts to focus on the captured image on ground glass 78 while approaching the temporary alignment with ground glass 78. FIG. 7 illustrates the temporary alignment of one of the telescoping tubular lens assembly 51, cutout 83 in shutter base 80 and window 85 of front slide plate 84 with ground glass 78. During this alignment, the captured image from ground glass 78 travels along path 110 through telescoping tubular lens assembly 51, cutout 83 in shutter base 80 and window 85 of front slide plate 84 to exposed portion 113 of film 112

Telescoping tubular lens assembly 51 moves out of alignment with ground glass 78 as the next telescoping tubular lens assembly 51 in sequence from one of the optical assemblies 50 focuses on ground glass 78, and approaches an alignment with ground glass 78, cutout 83 in shutter base 80 and window 85 of front slide plate 84. During the alignment, the captured image of the subject follows path 110 to another exposed portion 113 of film 112. This process continues at a high rate of speed to capture a series of images of the subject on film 112. In one embodiment, the captured image of the subject travels along path 110 from ground glass 78 to exposed portion 113 of film 112 during the time each telescoping tubular lens assembly 51 is in proximity to the alignment with ground glass 78, e.g., captured image travels to the film starting when telescoping tubular lens assembly 51 is in a position slightly before the alignment with ground glass 78 until telescoping tubular lens assembly 51 is in a position slightly past the alignment with ground glass 78.

Figure 10:
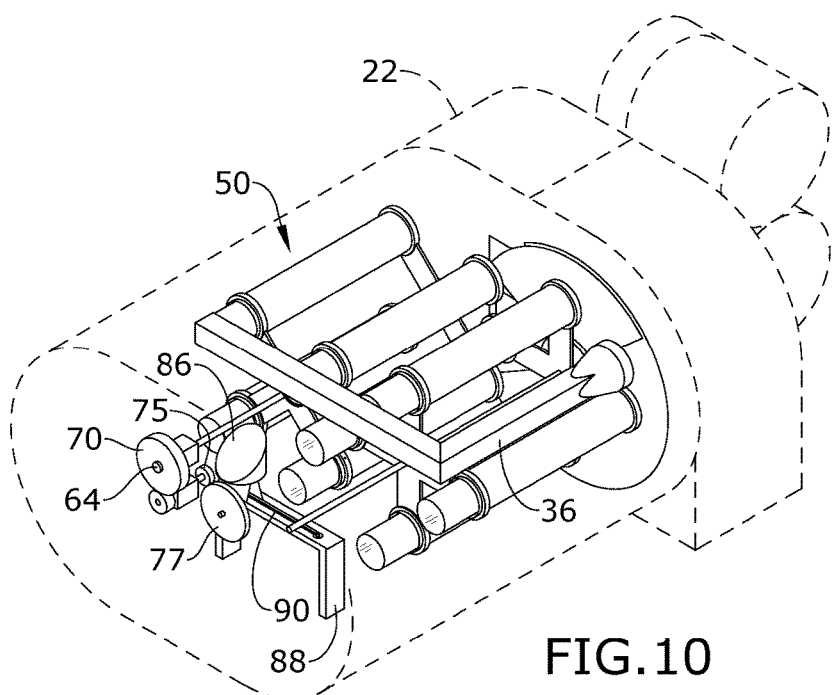
FIG. 10 depicts a front perspective view of certain embodiments of the camera illustrating certain internal components.

In one embodiment as depicted in FIGS. 7 and 10, mirror 86 is slidably mounted to track 90 on table 88 in internal cavity 11 of the camera. Mirror 86 is operably connected to the plurality of linkage members connected to motor 66. In one embodiment, second front gear 69 drives small mirror gear 75 via a shaft. Small mirror gear 75 drives large mirror gear 77, which drives gear box 92. Gear box 92 slides mirror 86 laterally along track 90 in and out of alignment with ground glass 78. Mirror 86 is configured to redirect the captured image of the subject on ground glass 78 to viewfinder 36.

In alternative embodiments, it shall be appreciated that any alternative configuration and number of gears, shafts, belts, bearings, sprockets, fasteners or other components can be used to facilitate the movement of any components of the camera previously described. It shall be appreciated that the components of the camera described in several embodiments herein may comprise any alternative known materials in the field and be of any color, size and/or dimensions. It shall be appreciated that the components of the camera described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A camera with a rotating optical lens assembly to capture enhanced quality footage of a subject at low to high speeds, the camera comprising:
   a housing comprising an internal cavity formed by a front face, a rear face, a top face connecting the front and rear faces together, a bottom face connecting the front and rear faces together, and a pair of side faces connecting the front, rear, top and bottom faces together;
   a main lens coupled to the front face of the housing;
   a ground glass coupled to the housing in the internal cavity and aligned with the main lens, the ground glass configured to capture an image of the subject from the main lens;
   a pair of optical assemblies rotatably mounted to the housing, each optical assembly in the pair of optical assemblies comprising a plurality of telescoping tubular lens assemblies;
   a magazine coupled to the housing and storing a film; and
   a motor coupled to the housing and operably connected to the pair of optical assemblies by a plurality of linkage members, wherein the motor is configured to simultaneously rotate the pair of optical assemblies in opposite directions to permit each telescoping tubular lens assembly in the pair of optical assemblies that moves in temporary alignment with the ground glass to transfer the captured image of the subject to an exposed portion of the film.

2. The camera of claim 1, wherein each telescoping tubular lens assembly in the pair of optical assemblies comprises an inner tube slidably mounted to an outer tube, a front end of the inner tube comprising a front optical lens coupled thereto and a rear end of the outer tube comprising a rear optical lens coupled thereto.

3. The camera of claim 2, wherein each optical assembly in the pair of optical assemblies comprises a rotatable shaft operably connected to the plurality of linkage members and a frame coupled to the rotatable shaft, the frame configured to secure the plurality of telescoping tubular lens assemblies in the optical assembly.

4. The camera of claim 3, further comprising a slide plate comprising a window and slidably mounted to the housing in the internal cavity, the slide plate operably connected to the motor by the plurality of linkage members, wherein the motor is configured to slidably adjust the slide plate so that the window temporarily aligns with the telescoping tubular lens assembly in alignment with the ground glass, thereby enabling the captured image of the subject to pass through the window in the slide plate to the exposed portion of the film.

5. The camera of claim 4, further comprising a shutter rotatably mounted to the housing in the internal cavity and operably connected to the motor by the plurality of linkage members.

6. The camera of claim 5, wherein the shutter comprises a cutout, the motor configured to rotatably adjust the shutter to temporarily align the cutout with the telescoping tubular lens assembly in alignment with the ground glass, thereby enabling the captured image of the subject to pass through the cutout of the shutter to the exposed portion of the film.

7. The camera of claim 6, further comprising a plurality of gears operably connected to the plurality of linkage members, wherein the motor is configured to drive the plurality of linkage members and plurality of gears to facilitate movement of the film behind the slide plate and shutter.

8. The camera of claim 7, further comprising a plurality of rollers in contact with the film and operably connected to the plurality of linkage members, wherein the motor is configured to drive the plurality of linkage members and plurality of rollers to facilitate the movement of the film behind the slide plate and shutter.

9. The camera of claim 8, further comprising a viewfinder coupled to the housing.

10. The camera of claim 9, further comprising a mirror slidably mounted to the housing in the internal cavity and operably connected to the plurality of linkage members, the mirror configured to redirect the captured image of the subject on the ground glass to the viewfinder.

* * * * *